(12) United States Patent
Deikman et al.

(10) Patent No.: US 6,912,595 B2
(45) Date of Patent: Jun. 28, 2005

(54) NOISE SUPPRESION FOR NETWORK TRANSCEIVERS

(75) Inventors: Alan Deikman, Fremont, CA (US); Rhonda S. Crum, San Jose, CA (US); Alton M. Wong, San Jose, CA (US)

(73) Assignee: ZNYX Networks, Inc., Fremont, CA (US)

(*) Notice: Subject to any disclaimer, the term of this patent is extended or adjusted under 35 U.S.C. 154(b) by 799 days.

(21) Appl. No.: 10/029,400

(22) Filed: Oct. 19, 2001

(65) Prior Publication Data

US 2003/0079044 A1 Apr. 24, 2003

(51) Int. Cl.[7] .............................................. G06F 15/16
(52) U.S. Cl. ..................................................... 709/250
(58) Field of Search .............................. 709/250; 714/1, 714/609

(56) References Cited

U.S. PATENT DOCUMENTS

| | | | | |
|---|---|---|---|---|
| 4,075,691 A | * | 2/1978 | Davis et al. ................... 710/64 |
| 5,142,526 A | * | 8/1992 | Moriue et al. ............... 370/245 |
| 5,497,460 A | * | 3/1996 | Bailey et al. .................. 714/39 |
| 5,822,524 A | * | 10/1998 | Chen et al. .................. 709/203 |
| 6,157,952 A | * | 12/2000 | Geiszler et al. ............. 709/224 |
| 6,430,606 B1 | * | 8/2002 | Haq ........................... 709/208 |
| 6,675,205 B2 | * | 1/2004 | Meadway et al. ........... 709/219 |

* cited by examiner

*Primary Examiner*—David Y. Eng
(74) *Attorney, Agent, or Firm*—Bever, Hoffman & Harms, LLP; Edward S. Mao

(57) ABSTRACT

A network interface system having a front module and a rear transition module is disclosed. The rear transition module is specifically designed to allow active components of the network interface system to be placed on the front module, so that only passive components are placed on the rear transition module. Thus, the mean time between failure of the rear transition module is increased. Specifically, one embodiment of the present invention includes series resistors between the transmit magnetics of the rear transition module and a rear transition connector. The series resistors suppress noise and reflection on the transmit lines.

19 Claims, 5 Drawing Sheets

NOISE SUPPRESION FOR NETWORK TRANSCEIVERS

FIELD OF THE INVENTION

The present invention relates network interface systems. More specifically, the present invention relates to using multiple boards in a network interface to increase the mean time between failure of the network interface.

BACKGROUND OF THE INVENTION

Due to decreasing prices and improving performance of computer systems, the number of computers in use is rapidly increasing. Furthermore, more and more computers are being coupled to computer networks to provide access to computing resources around the world. Consumer computer systems are typically coupled to a network using a network interface card. FIG. 1 illustrates a typical network interface card 100 coupled to a network 110. Network interface card 100 includes a network controller 103, a transceiver 105, transmit magnetics 107, and receive magnetics 109. Network controller can be for example an Ethernet controller, a FDDI controller or a token ring controller. For clarity, the examples presented herein use Ethernet controllers and Ethernet networks. However the principles of the present invention can be used with other types of network controllers and other types of networks. Network interface cards typically also includes a network connector (not shown), such as an RJ 45 connector.

Network controller 103 communicates with the computer system and converts data from the computer system for transmission on network 110. Furthermore, network controller 103 converts data on network 110 for use by the computer system. Specifically, network controller 103 is coupled to transceiver 105, which converts data signals from network controller 103 to the proper voltage and timing of network 110. Specifically transceiver 105 generates outgoing data on a pair of differential transmit lines T+ and T−. For clarity, lines and signals on the lines are given the same reference names. Thus, transmit signal T+ is on transmit line T+. Transmit lines T+ and T− are coupled to transmit magnetics 107. Transmit magnetics 107 provides DC isolation between transceiver 105 and network 110. For example, magnetics may be used to limit electrical connections only within certain frequency ranges, such as 10 Khz to 100 Mhz. Furthermore, the magnetics serve as a protective barrier against electromagnetic interference from power supplies, telephone ring signals, electrostatic discharges, and lightning strikes. Typically, the placement of transceiver 105 with respect to transmit magnetics 107 are carefully defined by the vendors of transceiver 105 and transmit magnetics 107. Specifically, vendors guarantee proper data signal characteristics only when transceiver 105 and transmit magnetics 107 are directly coupled and in close proximity on a single printed circuit board. Transmit magnetics 107 are coupled to network 110 by a pair of differential transmit lines T_NET+ and T_NET−. Data from network 110 are received on a pair of differential receive lines R_NET+ and R_NET−. Receive magnetics 109 provides DC isolation between differential receive lines R_NET+ and R_NET− and differential receives lines R+ and R−, which are coupled to transceiver 105.

With the rapid evolution of computer technology, prices on all facets of computer systems including computer networking has fallen drastically. Thus, many facets of computer networking have been adapted for use in other industries such as telecommunications. Telecommunication equipment generally must conform to predefined standards. For example, networking gear used in telecommunications are usually mounted in racks that include a back plane. The racks allow a front module and a rear transition module to be coupled through the back plane. Furthermore, telecommunications equipment typically must provide input/output connections on the rear transition module. The advantage of splitting the network interface onto a front module and a rear transition module is that the front module can be easily replaced without requiring the rewiring of the input/output connections residing on the rear transition module.

FIG. 2 illustrates a typical network interface for a telecommunications rack 200. The mechanical portions of telecommunications rack 200, such as the rack sides, board guides, and network connectors are omitted for clarity. Telecommunications rack 200 includes a back plane 230 having connectors 232 and 234. Connector 232 is configured to connect to a front module 210. Connector 234 is configured to connect to a rear transition module 220. In general, connector 232 and connector 234 share a set of pins and thus couples front module 210 to rear transition module 220. Although not shown, back plane 230 typically includes multiple slots for multiple front modules and multiple rear transition modules. In addition, most embodiments of rack 200 and back plane 230 have multiple connectors in each slot. Thus a front module can be coupled to a rear transition module using multiple connectors.

As explained above, vendors of transceiver 105 require that transceiver 105 and transmit magnetics 107 be directly coupled and in close proximity on a single printed circuit board. Thus, as shown in FIG. 2, both transceiver 105 and transmit magnetics 107 are placed on rear transition module 220. For clarity, similar elements in different figures are referenced by the same reference numerals. Transceiver 105 is coupled to transmit magnetics 107 by differential transmit lines T+ and T−. Transmit magnetics 107 are coupled to a network (not shown) using differential transmit lines T_NET+ and T_NET−. Receive magnetics 109 are also placed on rear transition module 220 and coupled to transceiver 105 by differential receive lines R+ and R−. Receive magnetics 109 receive incoming network data on differential receive lines R_NET+ and R_NET−. Generally differential transmit lines T_NET+ and T_NET− and differential receive lines R_NET+ and R_NET− are coupled to a network connector (not shown) on rear transition module 220. The network connector facilitates connection between the network and rear transition module 220. Transceiver 105 is coupled to a connector 223, which can be connected to connecter 234 on back plane 234.

Front module 210 include network controller 103, which is coupled to a connector 215, which can be connected to connector 232 on back plane 230. When connecter 215 of front module 210 is connected to connector 232 of back plane 230 and connector 223 of rear transition module 220 is connected to connector 234 of backplane 230, network controller 103 is coupled to transceiver 105.

As stated above, a major advantage of using a front module and a rear transition module is that the front module can be replaced without rewiring the connections to the rear transition module. However, to realize this advantage, the rear transition board must be more reliable than the front module. Usually reliability of an electronic device is measured using the mean time between failure (MTBF), which represents the average time the part will function before failing in some way. Telecommunications equipment requires very high MTBF for rear transition modules.

However, the presence of transceiver 105, which is an active component, on rear transition module 220 lowers the MTBF of rear transition module 220. In general, devices with active components, i.e. components which amplify or generates electronics signals, are rated with a lower MTBF than devices with only passive components, such as transmit magnetics 107 and receive magnetics 109. However, as explained above, most transceiver vendors stipulates that transceiver 105 must be directly coupled to transmit magnetics 107 and that transceiver 105 and transmit magnetics 107 must be in close proximity on a single printed circuit board. Hence, there is a need for a network interface system using multiple boards with one of the boards having a high MTBF.

SUMMARY OF THE INVENTION

Accordingly, the present invention provides a network interface system including a front module and a rear transition module. The rear transition module provides the input output signals for networking but does not require the placement of active components on the rear transition module. Thus, the mean time between failure of the rear transition module is increased.

The front module includes active components such as the network controller and the transceiver. The rear transition module includes the transmit magnetics and the network connector. The front module and the rear module are generally coupled together via a backplane. Thus, the front module includes a front connector for coupling to the backplane. Similarly, the rear transition module includes a rear transition connector for coupling with the backplane. The network controller on the front module includes transmit lines coupled to the front connector. The transmit line are coupled to transmit magnetics through the backplane and series resistors to the transmit magnetics. Specifically, the series resistors are placed between on the rear transition module between the transmit magnetics and the rear transition connector to suppress noise and reflection of the signals on the transmit lines. The rear transition module also includes receive magnetics, which may be combined with the transmit magnetics in a single component.

Some embodiments of the present invention, provide high density network interfaces by placing several network interfaces on a single pair of front modules and rear transition modules. For example, one embodiment of the present invention includes a second transmit magnetics on the rear transition module. Furthermore, this embodiment includes additional resistors coupled between the second transmit magnetics and the rear transition connector. Other embodiments may include more eight or more network controllers, transmit magnetics, receive magnetics, and series resistors. a. The present invention will be more fully understood in view of the following description and drawings.

DETAILED DESCRIPTION

As explained above, an electronic device can achieve higher MTBF by reducing the number of active components. To maximize MTBF of the rear transition module, some standards for telecommunications equipment requires that the rear transition module contains no active parts. However, transceiver vendors only guarantee proper signal characteristics when the transceiver and the transmit magnets are directly coupled and in close proximity on a single printed circuit board. The present invention utilizes a novel connection system to provide both high MTBF and guarantees proper signal. Specifically, the novel connection system allows the transceiver and the transmit magnetics to be on different printed circuit boards while maintaining proper output signal characteristics.

Figure 1:
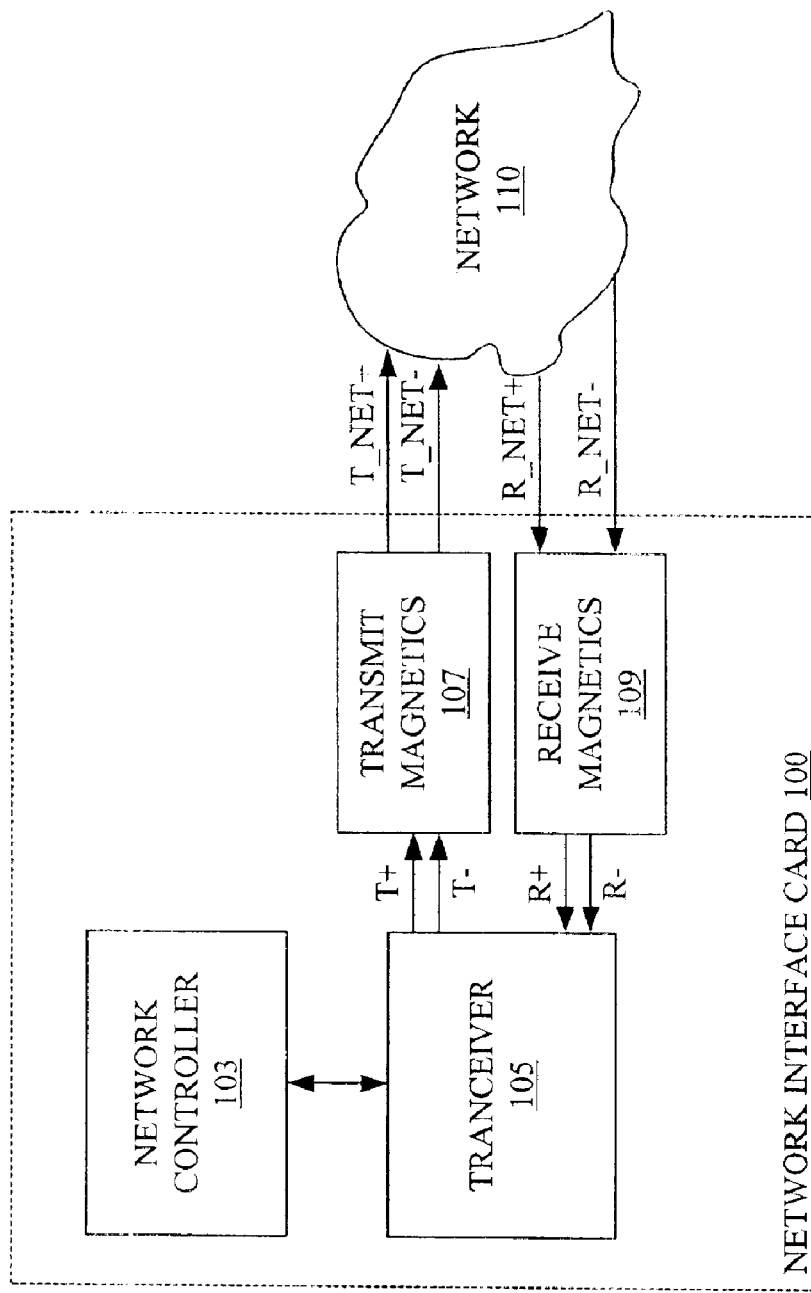
FIG. 1 is a block diagram of a conventional network interface card for a multi-carded computer system.
Figure 2:
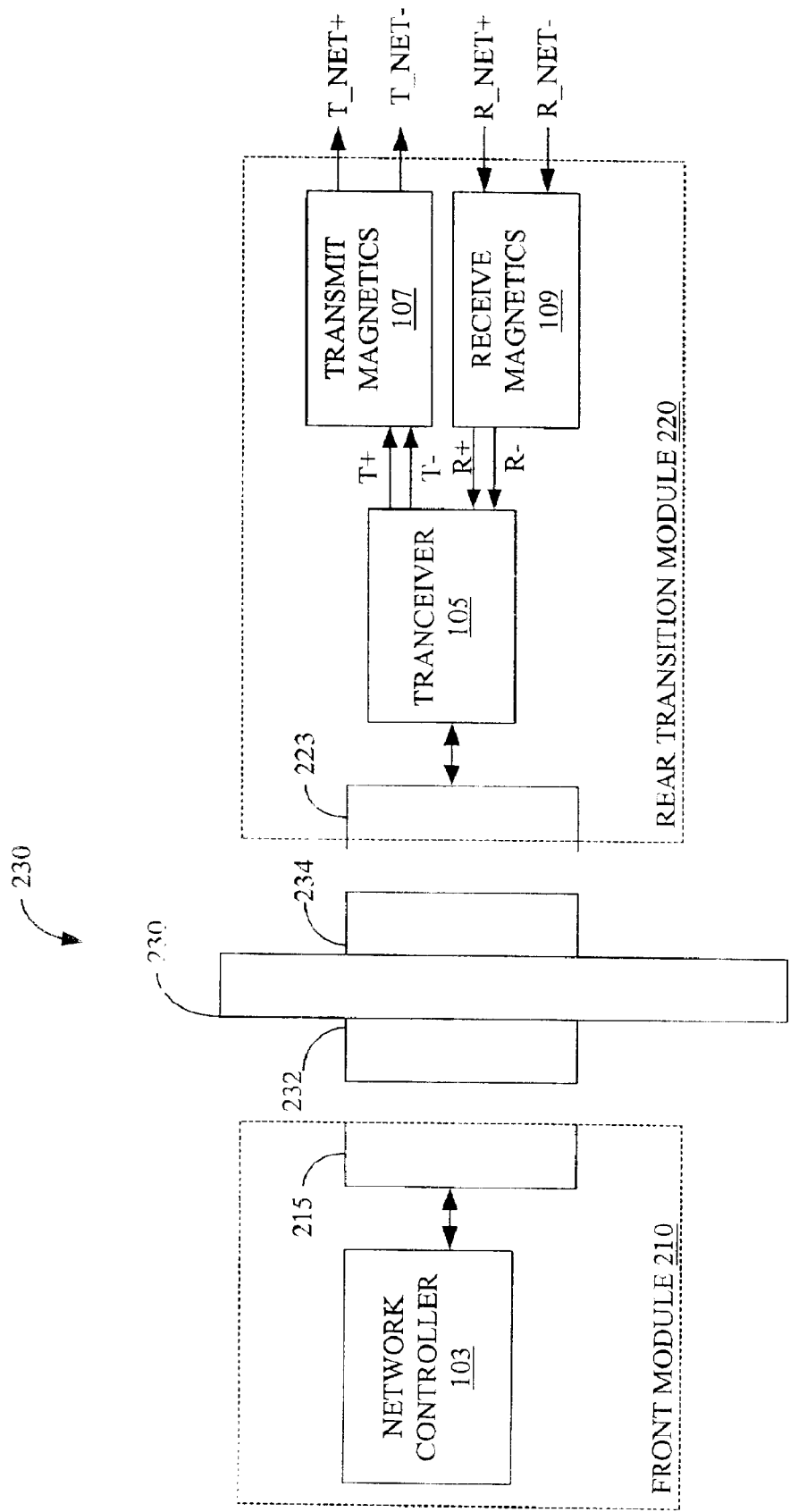
FIG. 2 is a block diagram of a conventional network interface.
Figure 3:
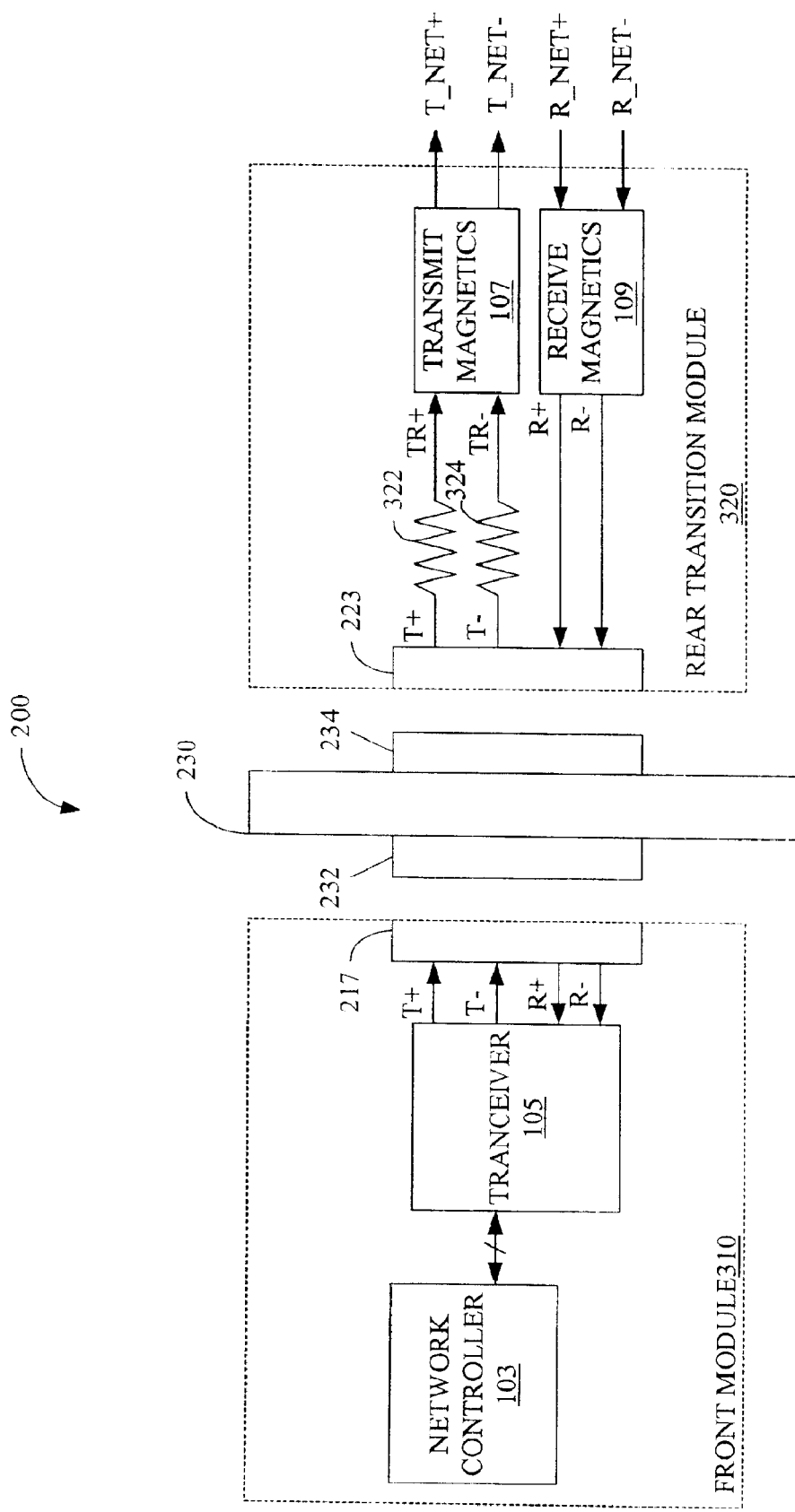
FIG. 3 is a block diagram of a network interface in accordance with one embodiment of the present invention.

FIG. 3 illustrates one embodiment of the present invention. The embodiment of FIG. 3 includes a front module 310 and a rear transition module 320. Front module 310 is configured to be coupled to rear transition module 320 using back plane 230. Front module 310 includes network controller 103, transceiver 105, and connector 217. Rear transition module 320 includes transmit magnetics 107, receive magnetics 109, a series resistor 322, a series resistor 324, and connector 223. In some embodiments, transmit magnetics 107 and receive magnetics 109 are combined in a single magnetics module. Because rear transition module 320 does not require active components, the MTBF of rear transition module 320 is very high and can satisfy even the most stringent standards of the telecommunication industry.

On front module 310, network controller 103 is coupled to transceiver 105, which drives a pair of differential transmit lines T+ and T−. Differential transmit lines T+ and T− are coupled to connector 217 and are configured to connect to series resistors 322 and 324 through connector 217 of front module 310, connector 232 of back plane 230, connector 234 of back plane 230, and connector 223 of rear transition module 320.

On rear transition module 320, series resistors 312 and 314 are coupled between transmit magnetics 107 and connector 223. Specifically, series resistors 312 and 314 are configured to receive transmit signals T+ and T−, respectively, from transceiver 105. For clarity, the transmit line after series resistor 312 and 314 are referenced as transmit lines TR+ and TR−. Differential transmit lines TR+ and TR− are coupled to transmit magnetics 107. Series resistors 322 and 324 should be located in close proximity to both connector 223 and transmit magnetics 107. In general the trace length between series resistors 322 and 324 with connector 223 should be under 0.5 inches. In addition the trace length between series resistors 322 and 324 with transmit magnetics 107 should be under 12 inches. In a specific embodiment of the present invention, the trace length between series resistors 322 and 324 with magnetics 107 are between 2.73 and 5.11 inches with an average trace length of approximately 3.95 inches.

Series resistors 312 and 314 suppress noise on transmit lines T+ and T−. Furthermore, series resistors 312 and 314 suppress reflection, which are caused by the connectors between transceiver 105 and transmit magnetics 107, on differential transmit lines T+ and T−. The noise and reflection suppression provided by series resistors 312 and 314 allows transceiver 105 and transmit magnetics 107 to reside on different boards while maintaining high signal quality on differential transmit lines T+ and T−. Generally, the resistance provided by series resistors 312 and 314 provide resistance in the range of 22 to 47 ohms. In an embodiment of the present invention for use with an Ethernet network, transceiver 105 is a Broadcom BCM5208 10BASE-TX transceiver, transmit magnetics 107 is an Xfmrs XFATM6 or Pulse H1012 and series resistors 312 and 314 have a resistance of 22 ohms ohms.

Transceiver 105 is also coupled to connector 217 by differential receive lines R+ and R−. Differential receive lines R+ and R− are configured to connect to receive magnetics 107 through connector 217 of front module 310, connector 232 of back plane 230, connector 234 of back plane 230, and connector 223 of rear transition module 320. Receive magnetics 109 is coupled to connector 223 of rear transition module 320. Furthermore receive magnetics 109 is configured to receive incoming network data on differential receive lines R_NET+ and R_NET−. For the embodiment described above for use with an Ethernet network, receive magnetics 109 and transmit magnetics 107 are combined in a single magnetics module an Xfmrs XFATM6 or Pulse H1012. Generally, differential receive lines R_NET+ and R_NET− and differential transmit lines T_NET+ and T_NET− are coupled to a network connector (not shown) on rear transition module 220 to facilitate physical connections between a network and rear transition module 220.

Further improvement in signal quality for differential transmit signals T+ and T− can be achieved using a variety of techniques. For example, some embodiments of the present invention minimizes the trace length of differential transmit lines T+ and T− on front module 330. Furthermore, some embodiments of the present invention match the routing paths of differential transmit lines T+ and T− to maintain a constant impedance between the between differential transmit lines T+ and T−. For example, for an embodiment of the present invention for use with Ethernet networks, differential transmit lines T+ and T− have an impedance of 100 ohms. In addition, eliminating vias and bends in the routing of differential transmit lines T+ and T− may also improve signal quality. Some embodiments of the present invention also improves signal quality of differential transmit lines T+ and T− by selecting pins which provide the most similar electrical characteristics in connector 217 for differential transmit lines T+ and T−. For example, some connectors, such as compact PCI connectors from AMP, ERNI, or Molex, are formed by multiple pin modules. For these types of connectors both differential transmit lines T+ and T− should be coupled to pins in the same pin module. The same techniques described above can also used with differential receive lines R+ and R− to improve the quality of differential receive signals R+ and R− from receive magnetics 109.

Figure 4:
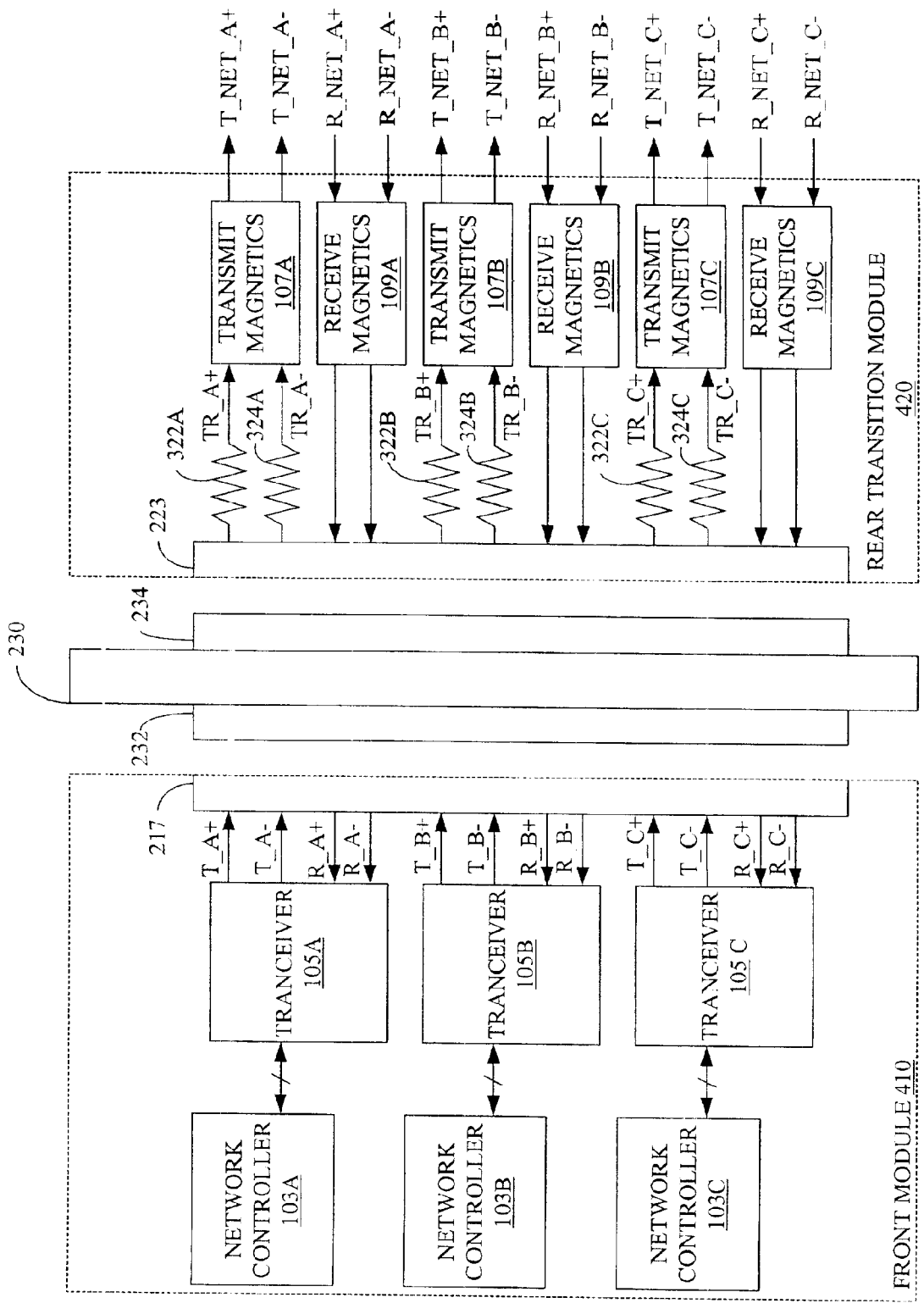
FIG. 4 is a block diagram of multiple network interfaces on a front module and a rear transition module in accordance with one embodiment of the present invention.

As shown in FIG. 4, some embodiments of the present invention provide multiple network interfaces using a single front module 410 with a single rear transition module 420. The embodiment of FIG. 4 includes three separate network interfaces. Other embodiments of the present invention may include many more network interfaces. Because the network interfaces of FIG. 4 are duplicates of the network interface shown in FIG. 3, the description is not repeated. However, the reference names and numerals of the different network interfaces are denoted with "_A", "_B", or "_C".

Figure 5:
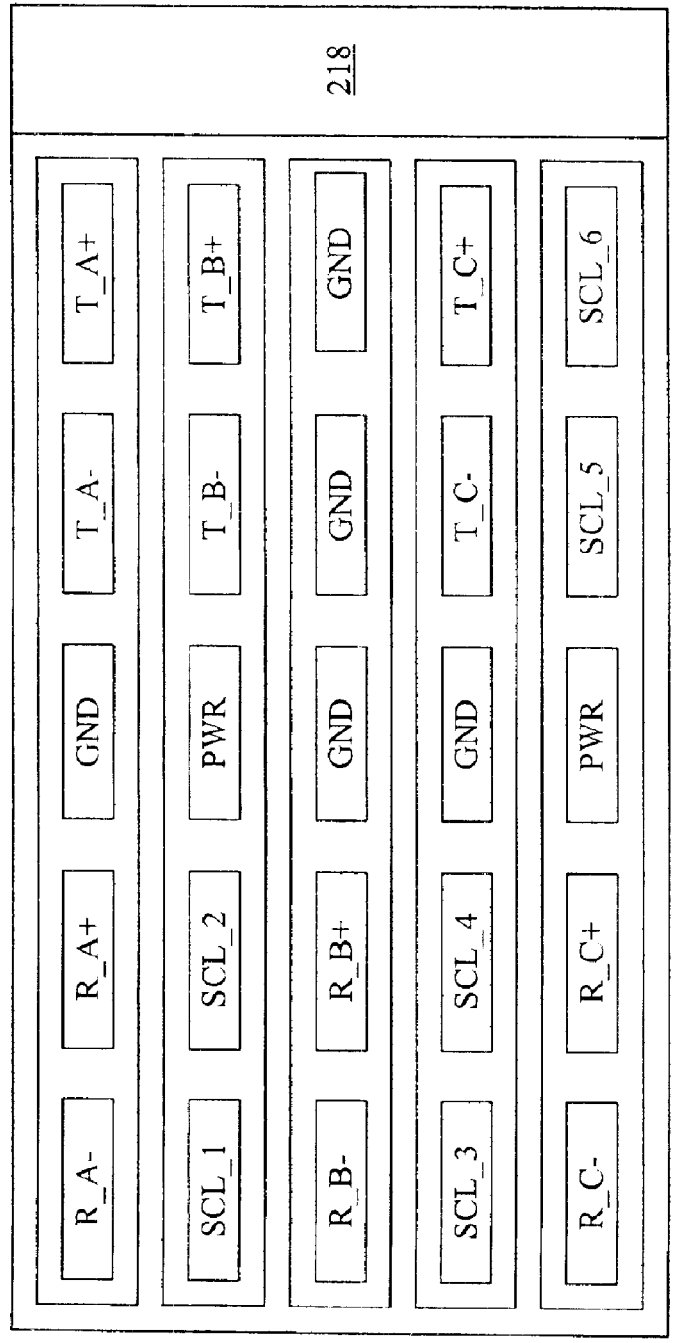
FIG. 5 is a representation of the pins of a connector used in one embodiment of the present invention.

When multiple network interfaces are used on a single board, cross talk between the network interfaces is likely to adversely impact the performance of the network interfaces. However, signal quality can be improved by careful arrangement of the signals on the connectors. FIG. 5 illustrates some pin selection techniques used by some embodiments of the present invention to improve signal quality. Specifically, FIG. 5 illustrates the pin selection on connecter 217 of FIG. 4. Connector 217 includes a shield 218 and contains 5 columns of pins. Transmit lines are placed in the columns adjacent shield 218 to reduce electromagnetic emissions. Each row of pins in connector 217 is a pin module. Thus as explained above, pairs of differential lines are placed on the same row. For example, differential receive lines R_A+ and R_A− are placed on the same row. Similarly, differential transmit lines T_C− and T_C+ are placed on the same row. Furthermore, pairs of differential transmit lines are generally placed on adjacent pins.

To reduce cross talk, the various pairs of differential receive lines are separated by pins used for slow changing lines. For example, differential receive lines R_A− and R_A+ are separated from differential receive lines R_B− and R_B+ by slow changing lines SCL_1 and SCL_2. To reduce cross talk between transmit lines and receive lines, power or ground lines are placed between transmit lines and receive lines. For example, in the embodiment of FIG. 5, ground pins GND and power pins PWR are placed in the center column of Connector 217. Crosstalk between pairs of transmit line can also be minimized by separating pairs of transmit line by slow changing lines. For example, transmit lines T_B− and T_B+ are separated from transmit lines T_C− and T_C+ by ground lines GND, which can be considered slow changing lines. However, pairs of transmit line can also be placed in adjacent rows because crosstalk between pairs of transmit lines can also be minimized by carefully controlling the timing of the transmit signals on adjacent pairs of transmit lines. Specifically, adjacent pairs of transmit line pairs should not transmit data at the same time.

In the above-described manner, low cost computer network interfaces can be made to conform to the requirements of the telecommunication industry. Specifically, series inverters are coupled between a transceiver and the transmit magnetics so that the transceiver and transmit magnetics can be placed on different printed circuit boards. Accordingly, a rear transition module with the transmit magnetics can be produced with little or no active components. Removing the active components increases the mean time between failure of the rear transition module to meet the requirements of the telecommunication industry. The various embodiments of the structures and methods of this invention that are described above are illustrative only of the principles of this invention and are not intended to limit the scope of the invention to the particular embodiments described. For example, in view of this disclosure, those skilled in the art can define other network controllers, transmit magnetics, receive magnetics, transceivers, back planes, connectors, and so forth, and use these alternative features to create a method or system according to the principles of this invention. Thus, the invention is limited only by the following claims.

What is claimed is:

1. A rear transition module of a network interface, the rear transition module comprising:
   a transmit magnetics;
   a connector;
   a first resistor having a first terminal coupled to the transmit magnetics and a second terminal coupled to the connector; and
   a second resistor having a first terminal coupled to the transmit magnetics and a second terminal coupled to the connector.

2. The rear transition module of claim 1, further comprising a receive magnetics coupled to the connector by a pair of differential receive lines.

3. The rear transition module of claim 1, wherein the first resistor and the second resistor are series resistors on a pair of differential transmit lines.

4. The rear transition module of claim 1, wherein the connector is configured to connect to a backplane.

5. The rear transition module of claim 4, wherein the back plane is configured to connect to a front module.

6. The rear transition module of claim 5, wherein the front module comprises:
- a network controller; and
- a transceiver coupled to the network controller.

7. The rear transition module of claim 1, wherein the first resistor has a resistance value in the range of 22 to 47 ohms.

8. The rear transition module of claim 1, wherein the connector is coupled to the first resistor by a signal line having a length less than half an inch.

9. The rear transition module of claim 1, further comprising:
- a second transmit magnetics;
- a third resistor having a first terminal coupled to the second transmit magnetics and a second terminal coupled to the connector; and
- a fourth resistor having a first terminal coupled to the second transmit magnetics and a second terminal coupled to the connector.

10. The rear transition module of claim 1, further comprising a network connector coupled to the transmit magnetics.

11. The rear transition module of claim 1, wherein no active components for transmitting or receiving data are placed on the rear transition module.

12. A network interface system comprising:
- a front module having
  - a network controller;
  - a transceiver coupled to the network controller
  - a front module connector coupled to the transceiver;
- a rear transition module having
  - a rear transition connector;
  - a transmit magnetics;
  - a first resistor having a first terminal coupled to the transmit magnetics and a second terminal coupled to the rear transition connector; and
  - a second resistor having a first terminal coupled to the transmit magnetics and a second terminal coupled to the rear transition connector; and
- a backplane having:
  - a front backplane connector configured to couple with the front module connector; and
  - a rear backplane connector configured to couple with the rear transition connector.

13. The network interface system of claim 12, wherein the rear transition module further comprises a receive magnetics coupled to the rear transition connector by a pair of differential receive lines.

14. The network interface system of claim 12, wherein the first resistor and the second resistor are series resistors on a pair of differential transmit lines.

15. The network interface system of claim 12, wherein the first resistor has a resistance value in the range of 22 to 47 ohms.

16. The network interface system of claim 12, wherein the rear transition connector is coupled to the first resistor by a signal line having a length less than half an inch.

17. The network interface system of claim 12, wherein the rear transition module further comprises:
- a second transmit magnetics;
- a third resistor having a first terminal coupled to the second transmit magnetics and a second terminal coupled to the rear transition connector; and
- a fourth resistor having a first terminal coupled to the second transmit magnetics and a second terminal coupled to the rear transition connector.

18. The network interface system of claim 17, wherein the front module further comprises:
- a second network controller; and
- a transceiver coupled to the network controller and the front module connector.

19. The network interface system of claim 1, wherein no active components for transmitting or receiving data are placed on the rear transition module.

* * * * *